United States Patent
Bortoli et al.

(10) Patent No.: US 9,970,526 B1
(45) Date of Patent: May 15, 2018

(54) RAM AIR TURBINE LIP SEAL SEALING SURFACE SLEEVE CAP

(71) Applicant: HAMILTON SUNDSTRAND CORPORATION, Charlotte, NC (US)

(72) Inventors: Stephen Michael Bortoli, Roscoe, IL (US); David Everett Russ, Rockford, IL (US); Timothy Scott Konicek, Rockford, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 515 days.

(21) Appl. No.: 14/620,603

(22) Filed: Feb. 12, 2015

Related U.S. Application Data (60) Provisional application No. 62/110,958, filed on Feb. 2, 2015.

(51) Int. Cl.

| | |
|---|---|
| *F01D 11/00* | (2006.01) |
| *F16H 57/029* | (2012.01) |
| *F16J 15/3204* | (2016.01) |
| *C22C 38/40* | (2006.01) |
| *C22C 38/06* | (2006.01) |
| *F16H 57/038* | (2012.01) |
| *B64D 41/00* | (2006.01) |

(52) U.S. Cl.
CPC .......... *F16H 57/029* (2013.01); *C22C 38/06* (2013.01); *C22C 38/40* (2013.01); *F16H 57/038* (2013.01); *F16J 15/3204* (2013.01); *B64D 41/007* (2013.01)

(58) Field of Classification Search
CPC .... F01D 11/003; F01D 11/005; F01D 25/183; F01D 15/10; F01D 25/285; F01D 25/16; B64D 41/007; F16H 57/02; F02C 7/36; F02C 7/32; F05D 2220/34
USPC ........................................................ 415/124.1
See application file for complete search history.

(56) References Cited

U.S. PATENT DOCUMENTS

| | | | | |
|---|---|---|---|---|
| 5,249,924 | A * | 10/1993 | Brum .................... | B64D 39/00 416/152 |
| 5,484,120 | A * | 1/1996 | Blakeley ............... | B64D 41/007 244/54 |
| 7,314,219 | B1 * | 1/2008 | Horvath ............... | F16J 15/3264 277/551 |
| 2012/0183402 | A1 * | 7/2012 | Bortoli ................. | B64D 41/007 416/170 R |
| 2012/0269616 | A1 * | 10/2012 | Bortoli ................. | F02C 7/32 415/122.1 |
| 2013/0256454 | A1 * | 10/2013 | Russ ..................... | F01D 15/08 244/58 |
| 2013/0259683 | A1 * | 10/2013 | Russ .................... | B64D 41/007 416/1 |
| 2016/0214741 | A1 * | 7/2016 | Chapman ............. | B64D 41/007 |

* cited by examiner

*Primary Examiner* — Aaron R Eastman (57) ABSTRACT

Described herein is a system for increasing the robustness of a sealing surface and eliminating an expensive plating operation. The system includes an axially rotatable object comprising a first material that is subject to corrosion. The system also includes a radial shaft seal positioned radially outward from the axially rotatable object. The system also includes a sleeve coupled to the axially rotatable object, positioned between the axially rotatable object and the radial shaft seal and comprising a second material that is corrosion resistant.

16 Claims, 6 Drawing Sheets

RAM AIR TURBINE LIP SEAL SEALING SURFACE SLEEVE CAP

CROSS-REFERENCE TO RELATED APPLICATIONS

This application is a non-provisional of, and claims priority to, and the benefit of U.S. Provisional Application No. 62/110,958 entitled "RAM AIR TURBINE LIP SEAL SEALING SURFACE SLEEVE CAP," filed on Feb. 2, 2015, which is hereby incorporated by reference in its entirety.

FIELD

The present disclosure relates to ram air turbines, and more particularly, to gearboxes of ram air turbines.

BACKGROUND

Ram air turbines are generally used in aircraft to provide supplemental and/or emergency power to the aircraft by utilizing air flow to rotate a turbine. Ram air turbines may provide electrical power, hydraulic power, or both. Electrical ram air turbines produce electrical power by transferring the rotation of the turbine to a power conversion device, such as a generator. Ram air turbines may include a gearbox for transferring power between a turbine shaft and a drive shaft. Lubricating fluid may be provided to lubricate the gear mesh. Seals may be included to prevent the lubricating fluid from leaking out of the gearbox. However, these seals leave portions of the drive shafts that extend outside of the sealing surfaces exposed to the environment, allowing the portions of the drive shafts to become corroded.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Described herein is a system for increasing robustness of a seal. The system includes an axially rotatable object comprising a first material that is subject to corrosion. The system also includes a radial shaft seal positioned radially outward from the axially rotatable object. The system also includes a sleeve coupled to the axially rotatable object, positioned between the axially rotatable object and the radial shaft seal and comprising a second material that is corrosion resistant.

Also described is a system for increasing robustness of a seal. The system includes an axially rotatable portion of a gear of a ram air turbine. The system also includes a radial shaft seal positioned radially outward from the axially rotatable portion of the gear. The system also includes a sleeve coupled to the axially rotatable portion of the gear, positioned between the axially rotatable portion of the gear and the radial shaft seal and comprising a second material that is corrosion resistant.

BRIEF DESCRIPTION OF THE DRAWINGS

The subject matter of the present disclosure is particularly pointed out and distinctly claimed in the concluding section of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the jet engines. As used herein, "forward" refers to the directed associated with the nose (e.g., the front end) of an aircraft, or generally, to the direction of flight or motion.

Figure 1:
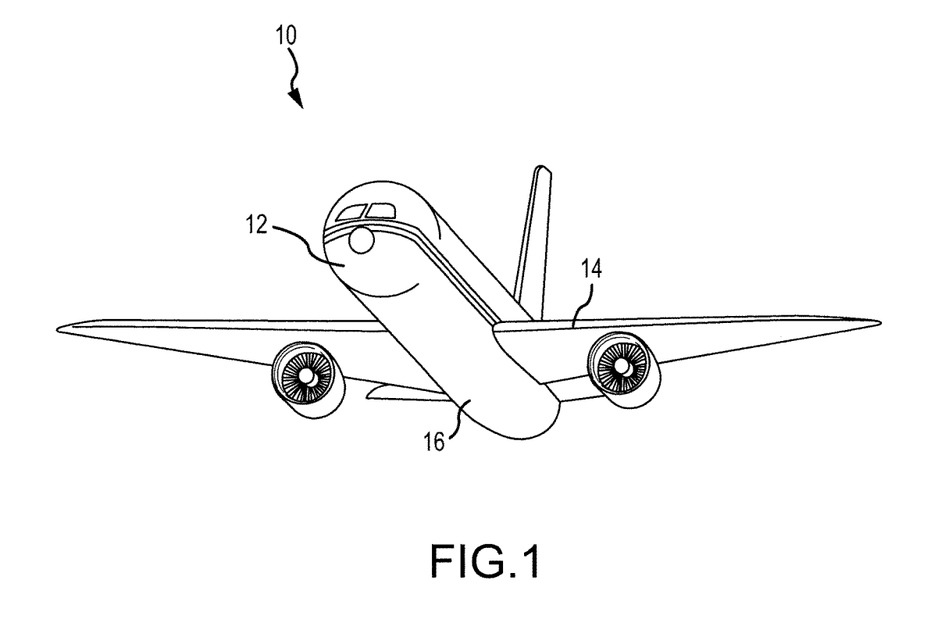
FIG. 1 illustrates a perspective view of an aircraft, in accordance with various embodiments.

In various embodiments and with reference to FIG. 1, an aircraft 10 may comprise wings 14 and a fuselage 16 having a nose 12. A ram air turbine 100 may be located within fuselage 16, nose 12 or wings 14, and when desired, ram air turbine 100 may be deployed into the path of airflow.

Figure 2:
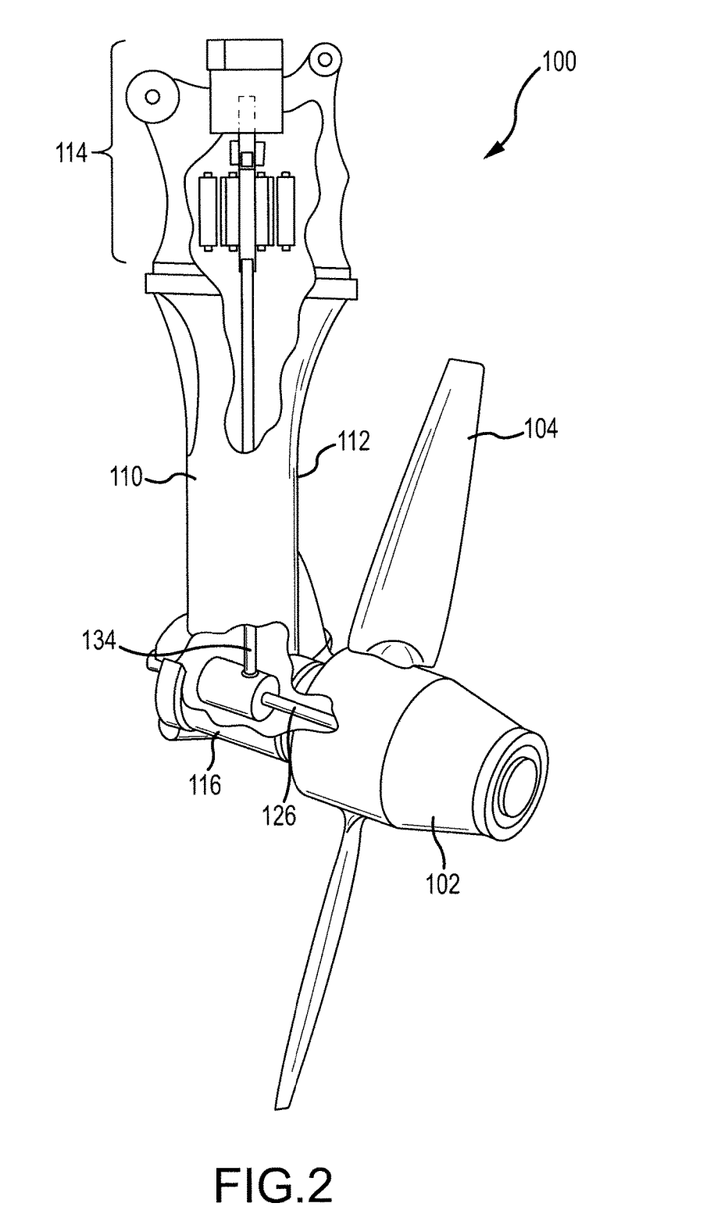
FIG. 2 illustrates a ram air turbine of an aircraft including a power conversion adapter section, a turbine section and a gearbox section, in accordance with various embodiments.

With reference to FIG. 2, ram air turbine 100 may comprise a turbine 102 having one or more blades 104. In various embodiments, turbine 102 is coupled to a gearbox 116 which is also coupled to strut 110. For example, strut 110 may be rotably connected to the rear of turbine 102 through a turbine shaft 126.

In various embodiments, strut 110 may be coupled to a power conversion adapter section 114. Power conversion adapter section 114 may include a generator adapter section, however, power conversion adapter section 114 is not limited to any particular power conversion device.

Figure 3:
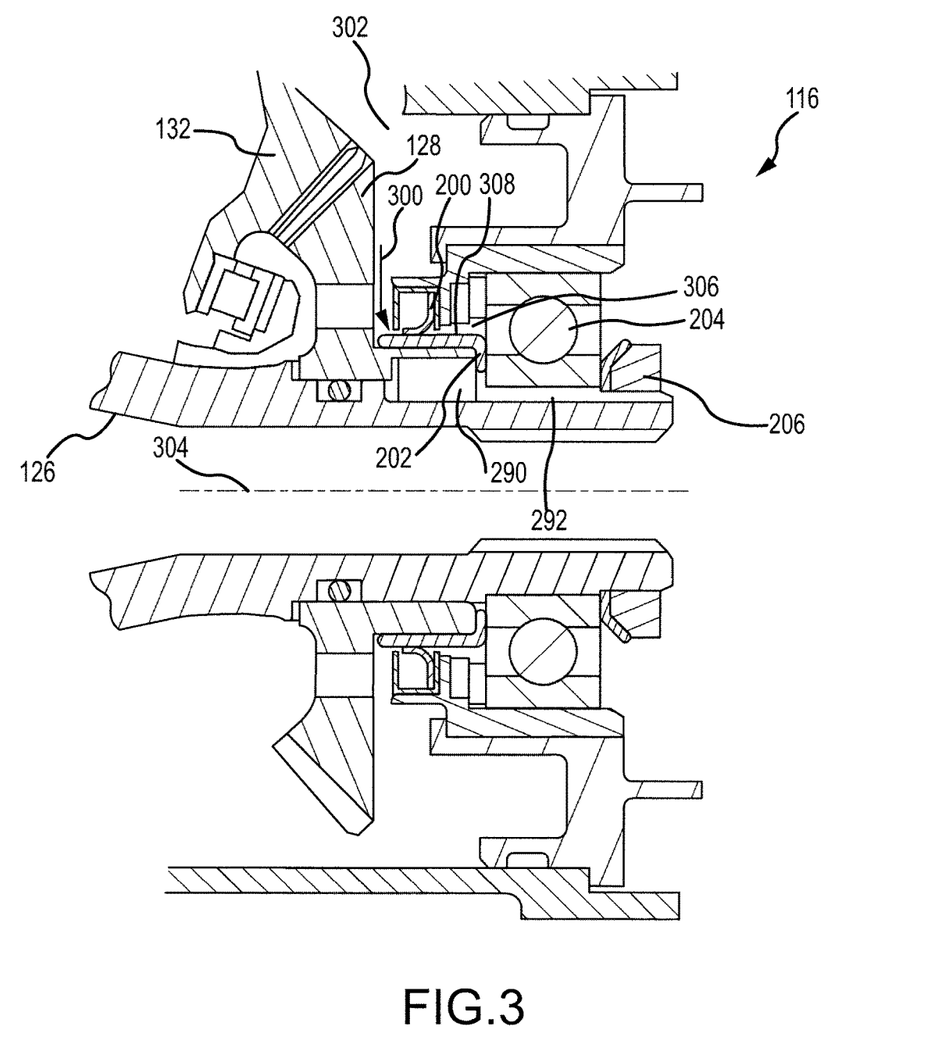
FIG. 3 illustrates a cross sectional view of a portion of the gearbox section of the ram air turbine of FIG. 2, in accordance with various embodiments.

In various embodiments and with reference to FIGS. 2 and 3, gearbox section 116 comprises a turbine shaft 126 and a bevel gear 128. Turbine shaft 126 may be removably coupled to turbine 102, allowing turbine shaft 126 to rotate with turbine blades 104. Gearbox section 116 may include a bearing 204 located at an opposite end of turbine 102. In such embodiments, the bearing may receive an end of turbine shaft 126.

Bevel gear 128 may be removably coupled to turbine shaft by a pin 290 or another manner, such as a splined connection. Bevel gear 128 may be oriented perpendicular to turbine shaft 126. In various embodiments, bevel gear 128 may comprise a beveled profile configured to interface with another gear and transmit rotation of turbine shaft 126 in a different direction. For example and with reference to FIGS. 2, 3 and 5, bevel gear 128 can interface with a pinion gear 132 to direct the rotational force of turbine shaft 126 to power conversion adapter section 114.

With reference now to FIG. 3, gearbox section 116 may define an area 302 that includes a lubricating fluid, such as oil. The lubricating fluid may lubricate the mesh between bevel gear 128 and pinion gear 132.

Gearbox section 116 includes a lip seal 200 (also known as a radial shaft seal as it is positioned radially outward from an axis of rotation) that is configured to prevent the lubricating fluid in area 302 from flowing aft towards aft bearing 204, as indicated by an arrow 300. While bevel gear 128 is adapted to rotate about an axis 304, lip seal 200 may be adapted to remain stationary relative to axis 304.

An area 306 may be exposed to an environment including elements which may corrode particular materials. As will be described below, bevel gear 128 may include these corrodible materials. Gear sleeve 202 is positioned on bevel gear 128 between bevel gear 128 and lip seal 200 and functions to reduce the likelihood of corrosive elements reaching bevel gear 128 and to reduce the likelihood of leakage of lubricating fluid by providing an excellent sealing surface (i.e., gear sleeve 202 reduces fluid flow between area 302 and area 306). When turbine shaft 126 rotates about axis 304, bevel gear 128 and gear sleeve 202 may rotate about axis 304. Gear sleeve 202 may rotate relative to and be in contact with lip seal 200, forming the seal between area 302 and area 306.

It is desirable for bevel gear 128 to be of high tensile strength. Accordingly, in order to avoid compromising strength, bevel gear 128 may comprise a non-corrosion resistant material as more suitable high tensile strength materials maybe non-corrosion resistant. In industry standard ram air turbines, bevel gears may be plated with a corrosion resistant material, such as by chemical vapor deposition, applying the coating from an aqueous solution by precipitation (electroless plating) or the like. The corrosion resistant plating protects the portion of the bevel gear that is exposed to elements other than lubricating fluid. In response to rotation of a turbine shaft about an axis, the lip seal could cause the corrosion resistant plating to chip and/or wear off the bevel gear, allowing lubricating fluid to leak between the bevel gear and the lip seal. Sustained leakage may result in diminished functionality of the gears. Additionally, the plating process can be costly.

Gear sleeve 202 includes a wear resistant material in order to reduce the likelihood of wear and chipping of bevel gear 128. In some embodiments, gear sleeve 202 may be machined from the wear resistant material. This reduces the likelihood of fluid flow between area 302 and area 306 as grooves may not form within the seal between lip seal 200 and bevel gear 128. Gear sleeve 202 may also include a corrosion resistant material such that bevel gear 128 may not include a coating.

In various embodiments, gear sleeve 202 may comprise a stainless steel alloy comprising between 0.9 and 1.35% aluminum, between 12.25 and 13.25% chromium, 76% iron, and 7.5 to 8.5% nickel by percent weight, commonly known as 13-8MO™ (available from AK Steel, Westchester, Ohio) and may be heat treated to at least 35 HRC (i.e., at least 35 on the Rockwell C Scale). In preferred embodiments, gear sleeve 202 may be heat treated to at least 43 HRC in order to increase wear resistance. In various embodiments, gear sleeve 202 may comprise other stainless steel and steel alloys, beryllium-copper alloys, or other materials having similar properties. 13-8MP™ is the preferred material because its properties include adequate corrosion resistance, adequate wear resistance and a thermal expansion coefficient that is close to the gear material thermal expansion coefficient.

Gear sleeve 202 may be coupled to bevel gear 128 in various manners. In various embodiments, gear sleeve 202 is press-fit onto bevel gear 128. In order to press-fit gear sleeve 202, a temperature of bevel gear 128 is reduced causing a reduction in volume and a temperature of gear sleeve 202 is increased causing an increase in volume. Gear sleeve 202 is then pressed onto bevel gear 128. When the temperature gear of bevel gear 128 and gear sleeve 202 are substantially the same (i.e., within 20 degrees Celsius of each other), gear sleeve 202 decreases in volume and bevel gear 128 increases in volume, causing gear sleeve 202 to tighten around bevel gear 128. In other embodiments, gear sleeve 202 may be bonded to bevel gear 128 via an adhesive, may be inertia welded to bevel gear 128, may be press-fit without altering the temperatures of bevel gear 128 and/or gear sleeve 202, or may be coupled by similar methods.

In embodiments using spanner nut 206, spanner nut 206 compresses aft bearing 204 and gear sleeve 202 between spanner nut 206 and bevel gear 128, causing gear sleeve 202 to resist motion relative to bevel gear 128. Accordingly, gear sleeve 202 may simply be assembled on bevel gear 128 and remain in place due to the compression force applied by spanner nut 206.

It is desirable for an outer surface 308 of gear sleeve 202 (i.e., the surface that contacts lip seal 200) to be smooth. This reduces the likelihood of lubricating fluid leaking between gear sleeve 202 and lip seal 200 as gear sleeve 202 rotates relative to lip seal 200. In order to obtain the smooth surface, outer surface 308 of gear sleeve 202 may be ground. In various embodiments, this grinding of gear sleeve 202 is performed after gear sleeve 202 is coupled to bevel gear 128 to minimize run out on the seal surface. After a period of use, outer surface 308 may be further ground to remedy any wear and/or chipping of gear sleeve 202 and/or outer surface 308 may be ground completely off and replaced to correct a defective sealing surface without destroying bevel gear 128, which is more costly than outer surface 308.

Figure 4:
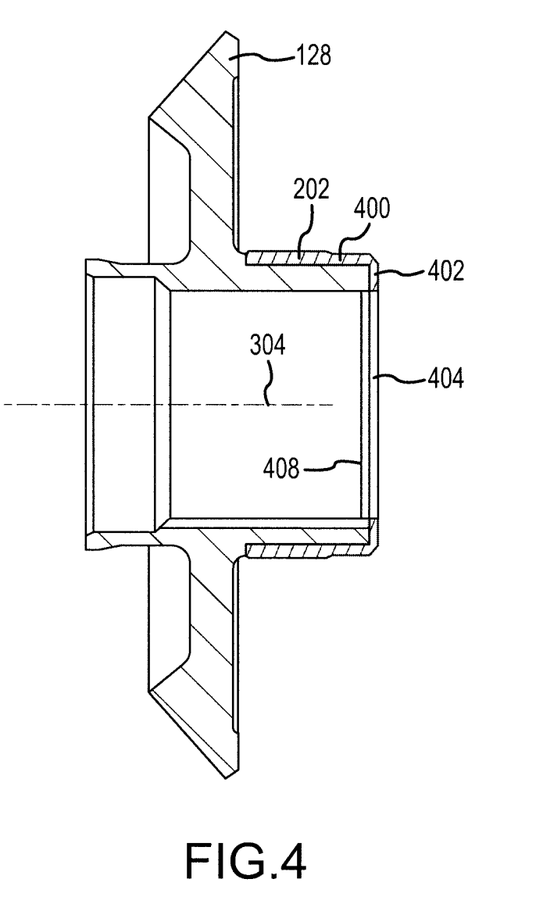
FIG. 4 illustrates a portion of the gearbox section of FIG. 2 including a cross sectional view of a gear sleeve, in accordance with various embodiments.

With reference now to FIG. 4, gear sleeve 202 includes an axial portion 400 (i.e., parallel to axis 304) and a radial portion 402 (i.e., radial to axis 304). Radial portion 402 may be substantially perpendicular to axial portion 400, i.e., forming an angle between 75 degrees and 105 degrees with axial portion 400 and may be considered a "flange". Axial portion 400 and radial portion 402 enclose an aft end 404 of bevel gear 128.

With reference now to FIGS. 3 and 4, bevel gear 128 includes a key slot 292 adapted to transmit power from turbine shaft 126 to bevel gear 128. A fluid such as grease is applied to key slot 292 to displace any moisture and protect bevel gear 128 from corrosion. Pin 290 may be inserted into key slot 292 with gear sleeve 202 in place after the fluid is inserted into bevel gear 128. Pin 290 and the gear assembly may then be slid into place to complete assembly.

In various embodiments, a gear sleeve that includes a radial portion without an axial portion may be applied to bevel gear 128. In these embodiments, the exposed area at aft end 404 of bevel gear 128 may be coated with primer, grease and/or another coating, such as a physical vapor deposition coating or another plating method, to provide corrosion resistance.

Figure 5:
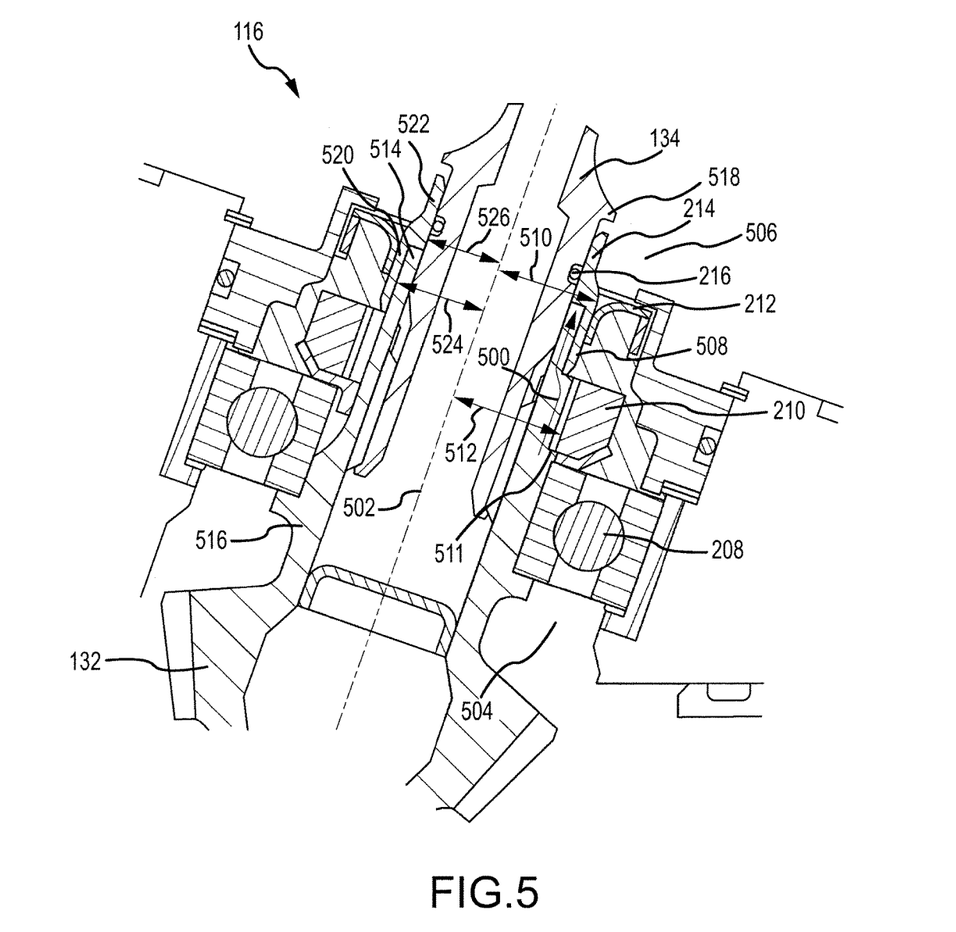
FIG. 5 illustrates a cross sectional view of another portion of the gearbox section of FIG. 2 including a pinion sleeve, in accordance with various embodiments.

With reference now to FIG. 5, driveshaft 134 is coupled to a pinion shaft 516 of pinion gear 132. With reference to FIGS. 3 and 5, in response to bevel gear 128 rotating about axis 304, bevel gear 128 engages pinion gear 132 and causes pinion gear, and thus driveshaft 134, to rotate about an axis 502.

Gearbox section 116 defines an area 504 around pinion gear 132 that includes lubricating fluid for lubricating the mesh of pinion gear 132 and bevel gear 128. Gearbox section 116 may further define an area 506 external relative to lip seal 212 that may be exposed to an environment including corrosive elements. A lip seal 212 is utilized to prevent the lubricating fluid from leaking to area 506 from area 504, as illustrated by arrow 500, and to prevent corrosive elements from reaching area 504 from area 506. While pinion gear 132 and pinion sleeve 214 may be adapted to rotate about axis 502, lip seal 212 does not rotate about axis 502.

In industry standard ram air turbines, a lip seal would be positioned adjacent a pinion shaft. Typically, the pinion shaft may be coated with a corrosion resistant plating or coating to prevent corrosion of the pinion shaft. Due to wear on the driveshaft by friction between the lip seal and the pinion shaft, the corrosion resistant surface may wear and/or chip, allowing lubricating fluid and corrosive elements to flow between the lip seal and the pinion shaft and allowing corrosion of the pinion shaft.

To prevent wear and/or chipping of pinion shaft 516, a pinion sleeve 214 may be coupled to pinion shaft 516 between pinion shaft 516 and lip seal 212. Pinion sleeve 214 may be coupled to pinion shaft 516 in the same or similar manner as gear sleeve 202 is coupled to bevel gear 128. For example, pinion sleeve 214 may be press-fit onto a distal end 514 of pinion shaft 516 such that pinion sleeve 214 encircles a distal end 514 of pinion shaft 516.

Pinion sleeve 214 may include a distal portion 522 that has a larger axial distance than radial distance. Pinion sleeve 214 may also include a proximal portion 520 that has a larger axial distance than radial distance and is coupled to pinion shaft 516 (i.e., proximal portion 520 makes contact with pinion shaft 516). Pinion sleeve may remain in position on distal end 514 via friction between pinion shaft 516 and proximal portion 520. Proximal portion 520 may have an inner radius having a distance 524 that is less than a distance 526 of an inner radius of distal portion 522.

Driveshaft 134 may define a protrusion 518 extending radially outward from driveshaft 134. Protrusion 518 reduces the likelihood of pinion sleeve 214 changing position axially away from pinion gear 132, as protrusion 518 may prevent distal portion 522 from being displaced axially away from pinion gear 132. An O-ring 216 and lip seal 212 may be positioned so that even if pinion sleeve 214 is displaced axially away from pinion gear 132, O-ring 216 and lip seal 212 still form a seal with pinion sleeve 214.

Pinion sleeve 214 may be designed such that a distance 510 from outer diameter surface 508 of pinion sleeve 214 to axis 502 is smaller than a distance 512 from an inner diameter surface 511 of spanner nut 210. This allows spanner nut 210 to remain in position relative to driveshaft 134 while pinion sleeve 214 is coupled to driveshaft 134.

Area 506 may be exposed to the environment, so it is desirable for pinion sleeve 214 to be corrosion resistant. Similarly, it is desirable for pinion sleeve 214 to resist wear caused by friction with lip seal 212. With reference to FIGS. 3 and 5, pinion sleeve 214 may comprise the same or a similar material as gear sleeve 202 for the same or similar reasons.

With reference back to FIG. 5, it is desirable for an outer diameter surface 508 of pinion sleeve 214 to be very smooth in order to reduce potential for leakage between pinion sleeve 214 and lip seal 212. In some embodiments, outer diameter surface 508 may be ground before being coupled to driveshaft 134 in order to cause outer diameter surface 508 to become smooth. In preferred embodiments, outer diameter surface 508 may be ground after being coupled to driveshaft 134.

Figure 6:
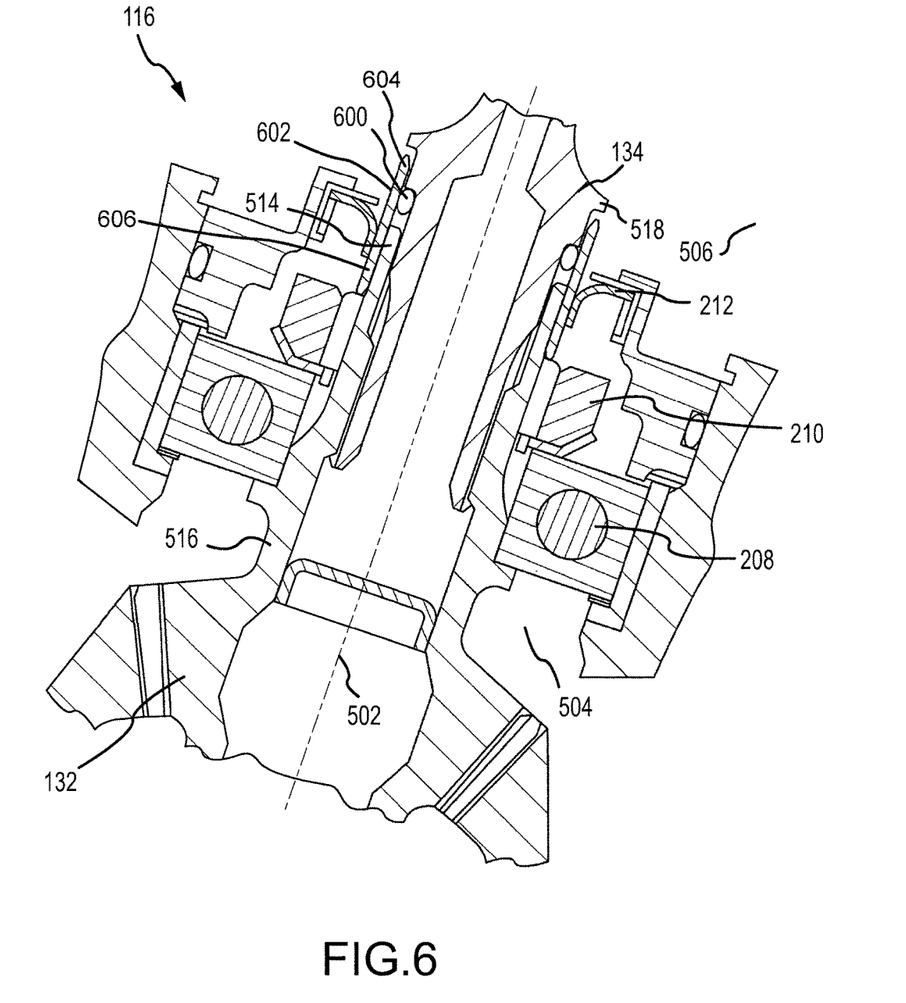
FIG. 6 illustrates a cross sectional view of the portion of the gearbox of FIG. 5 including another pinion sleeve, in accordance with various embodiments.

With reference now to FIG. 6, a pinion sleeve 602 may also be a straight sleeve. Pinion sleeve 602 may include a first end 604 and a second end 606. Pinion sleeve 602 may be positioned between pinion shaft 516 and lip seal 212. Pinion sleeve 602 may be coupled to pinion shaft 516 in the same or similar manner as pinion sleeve 214. Second end 606 may be positioned about distal end 514 of pinion shaft 516 and first end 604 may be positioned about driveshaft 134. Protrusion 518 may prevent pinion sleeve 602 from slipping in the direction of first end 604 and spanner nut 210 may prevent pinion sleeve 602 from slipping in the direction of second end 606. Between first end 604 and second end 606 may be a portion of pinion sleeve 602 that is not in contact with pinion shaft 516 and driveshaft 134. An O-ring 600 may be positioned about driveshaft 134 at this location and pinion sleeve 602 may contact O-ring 600. The gland for O-ring 600 is not formed in a single part like conventional glands. Instead, a shoulder on shaft 134 forms one wall of the O-ring gland while the second wall is formed by the end of pinion gear 516. A radial squeeze between pinion sleeve 602 and driveshaft 134 allows O-ring 600 to seal in the conventional manner. This construction allows pinion sleeve 602 to be simple relative to pinion sleeve 214. It also reduces the stress in shaft 134 by eliminating the conventional O-ring groove.

With reference now to FIGS. 3 and 5, a sleeve such as gear sleeve 202 or pinion sleeve 214 may be utilized in any system in which a stationary seal (i.e., lip seal 200, lip seal 212) is positioned about a rotating object (i.e., bevel gear 128, driveshaft 134). The sleeve may increase the robustness of the seal by providing a wear resistant, corrosion resistant and smooth surface for the seal to contact. These characteristics will decrease the likelihood of leakage via the seal.

Sleeves such as gear sleeve 202 or pinion sleeve 214 may be removed and/or replaced with minimal damage components to which they are coupled. Additionally, sleeves similar to those disclosed herein provide the benefit and advantage of allowing a set of gears to be produced at one location without having to send the gears to another location for being plated. Sending gears to another location for plating may be expensive and time consuming, and sometimes the plating may be poorly performed. Accordingly, the gears may be produced at a single location before installation the ram air turbine 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for increasing robustness of a seal, comprising:
   an axially rotatable object comprising a first material that is subject to corrosion;
   a radial shaft seal positioned radially outward from the axially rotatable object; and
   a sleeve coupled to the axially rotatable object, positioned between the axially rotatable object and the radial shaft seal and comprising a second material that is corrosion resistant,
   wherein:
      the radial shaft seal is located radially outward from the sleeve and contacts the sleeve to reduce the likelihood of fluid leakage, and
      the axially rotatable object is a bevel gear of a ram air turbine and the sleeve is coupled to an aft end of the bevel gear and positioned between an aft bearing and the bevel gear.

2. The system of claim 1, wherein the second material is a stainless steel alloy comprising between 0.9 and 1.35% aluminum, between 12.25 and 13.25% chromium, 76% iron, and 7.5 to 8.5% nickel by weight.

3. The system of claim 1, wherein the sleeve rotates relative to the radial shaft seal.

4. The system of claim 1, wherein the axially rotable object includes a gear of a gear set of the ram air turbine and the gear set is produced at a single location before being assembled on the ram air turbine.

5. The system of claim 1, wherein the sleeve has an outer surface configured to contact the radial shaft seal that is ground to reduce surface irregularities of the outer surface.

6. The system of claim 5, wherein the outer surface of the sleeve is ground after the sleeve is coupled to the axially rotatable object.

7. A system for increasing robustness of a seal, comprising:
   an axially rotatable portion of a gear of a ram air turbine;
   a radial shaft seal positioned radially outward from the axially rotatable portion of the gear; and
   a sleeve coupled to the axially rotatable portion of the gear, positioned between the axially rotatable portion of the gear and the radial shaft seal and comprising a second material that is corrosion resistant,
   wherein:
      the radial shaft seal is located radially outward from the sleeve and contacts the sleeve to reduce the likelihood of fluid leakage, and
      the axially rotatable portion of the gear is at least one of an aft end of a bevel gear or an end of a shaft of a pinion gear.

8. The system of claim 7, wherein the second material is a stainless steel alloy comprising between 0.9 and 1.35% aluminum, between 12.25 and 13:25% chromium, 76% iron, and 7.5 to 8.5% nickel.

9. The system of claim 8, wherein the second material is heat treated to at least 35 on the Rockwell C Scale.

10. The system of claim 7, wherein the sleeve is press fit onto the axially rotatable portion of the gear.

11. The system of claim 7, wherein an outer surface of the sleeve is ground after the sleeve is coupled to the axially rotatable portion of the gear.

12. A system for increasing robustness of a seal, comprising:
   an axially rotatable object comprising a first material that is subject to corrosion;
   a radial shaft seal positioned radially outward from the axially rotatable object; and
   a sleeve coupled to the axially rotatable object, positioned between the axially rotatable object and the radial shaft seal and comprising a second material that is corrosion resistant,
   wherein:
      the radial shaft seal is located radially outward from the sleeve and contacts the sleeve to reduce the likelihood of fluid leakage, and
      the axially rotatable object is a shaft of a pinion gear of a ram air turbine and the sleeve is coupled to a distal end of the shaft and configured to be held in position by a protrusion of the shaft.

13. The system of claim 12, wherein the second material is a stainless steel alloy comprising between 0.9 and 1.35% aluminum, between 12.25 and 13.25% chromium, 76% iron, and 7.5 to 8.5% nickel by weight.

14. The system of claim 12, wherein the sleeve rotates relative to the radial shaft seal.

15. The system of claim 12, wherein the axially rotable object includes a gear of a gear set of the ram air turbine and the gear set is produced at a single location before being assembled on the ram air turbine.

16. The system of claim 12, wherein the sleeve has an outer surface configured to contact the radial shaft seal that is ground to reduce surface irregularities of the outer surface.

* * * * *